(12) United States Patent
Ma

(10) Patent No.: US 11,297,213 B2
(45) Date of Patent: Apr. 5, 2022

(54) DISPLAY PANEL, FABRICATING METHOD THEREOF, AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Weixin Ma, Wuhan (CN)

(*) Notice: Subject to any disclaimer, the term of this patent is extended or adjusted under 35 U.S.C. 154(b) by 240 days.

(21) Appl. No.: 16/629,565

(22) PCT Filed: Sep. 9, 2019

(86) PCT No.: PCT/CN2019/104936
§ 371 (c)(1),
(2) Date: Jan. 9, 2020

(87) PCT Pub. No.: WO2021/012360
PCT Pub. Date: Jan. 28, 2021

(65) Prior Publication Data
US 2021/0409583 A1 Dec. 30, 2021

(30) Foreign Application Priority Data
Jul. 22, 2019 (CN) .......................... 201910659944.2

(51) Int. Cl.
*G02F 1/1343* (2006.01)
*G02F 1/1335* (2006.01)
(Continued)

(52) U.S. Cl.
CPC ..... *H04N 5/2257* (2013.01); *G02F 1/133516* (2013.01); *H04N 5/2253* (2013.01);
(Continued)

(58) Field of Classification Search
CPC ............. G02F 1/1335; G02F 1/133514; G02F 1/133512; G02F 1/133516;
(Continued)

(56) References Cited

U.S. PATENT DOCUMENTS 11,048,294 B2 * 6/2021 Yin ................... G02F 1/133528
2011/0194062 A1 * 8/2011 Lee ....................... G02F 1/1339
349/149
2019/0253591 A1 8/2019 Chen et al.

FOREIGN PATENT DOCUMENTS

CN 106935144 A 7/2017
CN 107229148 A 10/2017
(Continued)

*Primary Examiner* — Thoi V Duong

(57) ABSTRACT

A display panel, a fabricating method thereof, and a display device are provided. The display panel includes a first substrate, a second substrate, a liquid crystal layer, and a camera assembly. A side of the first substrate adjacent to the second substrate is provided with a color filter layer. The color filter layer is provided with a light-transmitting portion, and a side of the second substrate adjacent to the first substrate is provided with a thin film transistor layer. A deflection of the liquid crystal is controlled by the thin film transistor layer, thereby realizing the condition that the camera assembly under the screen obtains external light and visual effect of full-screen display.

15 Claims, 3 Drawing Sheets

(51) Int. Cl.
*G02F 1/1333* (2006.01)
*H04N 5/225* (2006.01)
*G02F 1/1368* (2006.01)

(52) U.S. Cl.
CPC ........ *G02F 1/1368* (2013.01); *G02F 1/13439* (2013.01); *G02F 1/133345* (2013.01)

(58) Field of Classification Search
CPC ......... G02F 1/133528; G02F 1/133331; G02F 1/1333; G02F 1/1337; G02F 1/1368; G02F 1/1343; G02F 1/1362; G02F 1/13439; G02F 2203/01; H04N 5/2257; H04N 5/2253
See application file for complete search history.

(56) References Cited

FOREIGN PATENT DOCUMENTS

| | | |
|---|---|---|
| CN | 108196388 A | 6/2018 |
| CN | 109100892 A | 12/2018 |
| CN | 109164648 A | 1/2019 |
| CN | 109976021 A | 7/2019 |

\* cited by examiner providing a first substrate and a second substrate, forming a color filter layer on the first substrate and a light-transmitting portion for providing a light propagation path, wherein the light-transmitting portion is a through hole penetrating the color filter layer — S10 sequentially forming a common electrode layer and a first alignment layer on a side of the color filter layer adjacent to the second substrate — S20 celling the first substrate and the second substrate into a display panel — S30 setting a camera assembly at a position corresponding to the light-transmitting portion on a side of the second substrate away from the first substrate — S40

FIG. 4

# DISPLAY PANEL, FABRICATING METHOD THEREOF, AND DISPLAY DEVICE

FIELD OF INVENTION

The present invention relates to the field of display technologies, and in particular, to a display panel, a fabricating method thereof, and a display device.

BACKGROUND OF INVENTION

Liquid crystal displays (LCD) have many advantages such as thin body, power saving, and no radiation, and have been widely used. With rapid development of liquid crystal display technology and the continuous increase in quality requirements of liquid crystal displays, people have higher and higher requirements on screen-to-body ratio of liquid crystal displays. Therefore, high screen-to-body ratio and narrow bezel have become important directions of product technology development.

Technical Problem

In order to achieve a higher screen-to-body ratio, when display screen size is increased, installation space of functional components on the front side of electronic devices is also reduced. In conventional art, these functional components are generally disposed on a side or back of electronic devices, or hidden designs that functional components are disposed under the screen. A front camera of mobile phones will occupy a certain screen space, resulting in a decrease in the screen-to-body ratio. One current solution is to create an opening in the screen of mobile phones, and place the front camera under the opening of the screen. Alternatively, the screen without opening and a certain blank region is reserved, the blank region is usually not displayed, and place the camera below the blank region. However, this design still sees appearance of the opening on the screen, and cannot achieve truly full-screen visual effect.

In summary, present liquid crystal display devices have a problem that screen-to-body ratio is relatively low. Therefore, it is necessary to provide a display panel, a fabricating method, and a display device to improve this defect.

SUMMARY OF INVENTION

Technical Solution

The embodiments of the present disclosure provide a display panel, a fabricating method thereof, and a display device, which are used to solve the problem that the present liquid crystal display devices have a relatively low screen-to-body ratio.

An embodiment of the present disclosure provides a display panel, including:
 a first substrate;
 a second substrate disposed opposite to the first substrate;
 a liquid crystal layer disposed between the first substrate and the second substrate; and
 a camera assembly disposed on a side of the second substrate away from the first substrate;
 wherein a color filter layer is disposed on a side of the first substrate adjacent to the second substrate, the color filter layer is provided with a light-transmitting portion at a position corresponding to the camera assembly, and a side of the second substrate adjacent to the first substrate is provided with a thin film transistor layer.

In accordance with an embodiment of the present disclosure, the light-transmitting portion is a through hole penetrating the color filter layer, and a cross-sectional shape of the light-transmitting portion comprises polygon, circle, or ellipse.

In accordance with an embodiment of the present disclosure, a cross-sectional area of the light-transmitting portion is greater than or equal to a cross-sectional area of the camera assembly.

In accordance with an embodiment of the present disclosure, the thin film transistor layer comprises a buffer layer, a gate insulating layer, a gate line layer, an interlayer dielectric layer, source-drain electrode layer, a planarization layer, and a pixel electrode layer, which are stacked on the second substrate.

In accordance with an embodiment of the present disclosure, the display panel further comprising a common electrode layer disposed on a side of the color filter layer adjacent to the second substrate.

In accordance with an embodiment of the present disclosure, the display panel further comprising a first alignment layer and a second alignment layer, wherein the first alignment layer is disposed on a side of the common electrode layer adjacent to the second substrate, and the second alignment layer is disposed on a side of the thin film transistor layer adjacent to the first substrate.

In accordance with an embodiment of the present disclosure, the display panel further comprising a first polarizer and a second polarizer, wherein the first polarizer is disposed on a side of the first substrate away from the second substrate, and the second polarizer is disposed between the second substrate and the camera assembly.

In accordance with an embodiment of the present disclosure, the first substrate is a color filter substrate, and the second substrate is an array substrate.

An embodiment of the present disclosure provides a display device including a display panel, the display panel comprising:
 a first substrate;
 a second substrate disposed opposite to the first substrate;
 a liquid crystal layer disposed between the first substrate and the second substrate; and
 a camera assembly disposed on a side of the second substrate away from the first substrate;
 wherein a color filter layer is disposed on a side of the first substrate adjacent to the second substrate, the color filter layer is provided with a light-transmitting portion at a position corresponding to the camera assembly, and a side of the second substrate adjacent to the first substrate is provided with a thin film transistor layer.

In accordance with an embodiment of the present disclosure, the light-transmitting portion is a through hole penetrating the color filter layer, and a cross-sectional shape of the light-transmitting portion comprises polygon, circle, or ellipse.

In accordance with an embodiment of the present disclosure, a cross-sectional area of the light-transmitting portion is greater than or equal to a cross-sectional area of the camera assembly.

In accordance with an embodiment of the present disclosure, the thin film transistor layer comprises a buffer layer, a gate insulating layer, a gate line layer, an interlayer dielectric layer, source-drain electrode layer, a planarization layer, and a pixel electrode layer, which are stacked on the second substrate.

In accordance with an embodiment of the present disclosure, the display panel further comprises a common electrode layer disposed on a side of the color filter layer adjacent to the second substrate.

In accordance with an embodiment of the present disclosure, the display panel further comprises a first alignment layer and a second alignment layer, the first alignment layer disposed on a side of the common electrode layer adjacent to the second substrate, and the second alignment layer disposed on a side of the thin film transistor layer adjacent to the first substrate.

In accordance with an embodiment of the present disclosure, the display panel further comprises a first polarizer and a second polarizer, wherein the first polarizer is disposed on a side of the first substrate away from the second substrate, and the second polarizer is disposed between the second substrate and the camera assembly.

In accordance with an embodiment of the present disclosure, the first substrate is a color filter substrate and the second substrate is an array substrate.

An embodiment of the present disclosure provides a method of fabricating a display panel, comprising:

step S10, providing a first substrate and a second substrate, forming a color filter layer on the first substrate and a light-transmitting portion for providing a light propagation path, wherein the light-transmitting portion is a through hole penetrating the color filter layer.

step S20, sequentially forming a common electrode layer and a first alignment layer on a side of the color filter layer adjacent to the second substrate;

step S30, ceiling the first substrate and the second substrate into a display panel; and step S40, setting a camera assembly at a position corresponding to the light-transmitting portion on a side of the second substrate away from the first substrate.

Beneficial Effect

Beneficial effects of the invention are as follows. Embodiments of the present disclosure provide a light-transmitting portion for providing a light propagation path on a color filter layer, and disposing a camera assembly on a side of a second substrate away from the first substrate at a position corresponding to the light-transmitting portion. After receiving a start command from the camera assembly, a thin film transistor layer controls a liquid crystal layer to deflect liquid crystal corresponding to the light-transmitting portion, so that light reaches the camera assembly through the liquid crystal layer, which realizes conditions for the camera assembly to capture external light under screen. After receiving a close command from the camera assembly, controlling the liquid crystal layer to deflect the liquid crystal corresponding to the light-transmitting portion, so that the light cannot pass through the liquid crystal layer, and the light-transmitting portion is black screen. Thereby, appearance of the screen in the display panel and the display device is unified, and effect of full-screen display is realized.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 4 is a schematic flowchart of a method of fabricating the display panel according to an embodiment of the present disclosure.

DETAILED DESCRIPTION OF EMBODIMENTS

Figure 1:
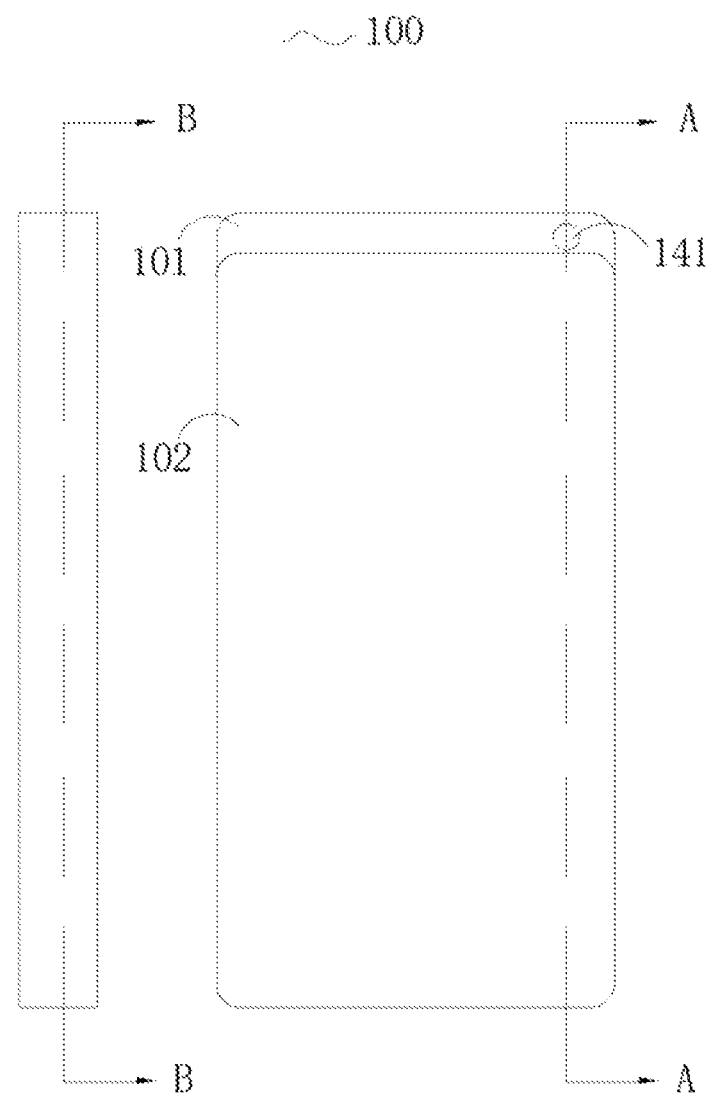
FIG. 1 is a schematic view of a display panel according to an embodiment of the present disclosure.

The following description of each embodiment, with reference to the accompanying drawings, is configured to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

The present disclosure will be further described below in conjunction with the accompanying drawings and specific embodiments.

An embodiment of the present disclosure provides a display panel, which will be described in detail below with reference to FIGS. 1 to 3.

As shown in FIG. 1, FIG. 1 is a schematic view of a display panel 100 according to an embodiment of the present disclosure. A left drawing is a schematic side view of the display panel 100, and a right drawing is a front view of the display panel 100. FIG. 2 is a schematic cross-sectional view of the display panel 100 along A-A direction in FIG. 1 according to an embodiment of the present disclosure. The display panel 100 includes a first substrate 110, a second substrate 120, a liquid crystal layer 130, and a camera assembly 160. The first substrate 110 and the second substrate 120 are oppositely disposed. The liquid crystal layer 130 is disposed between the first substrate 110 and the second substrate 120. The camera assembly is disposed on a side of the second substrate 120 away from the first substrate 110.

Figure 2:
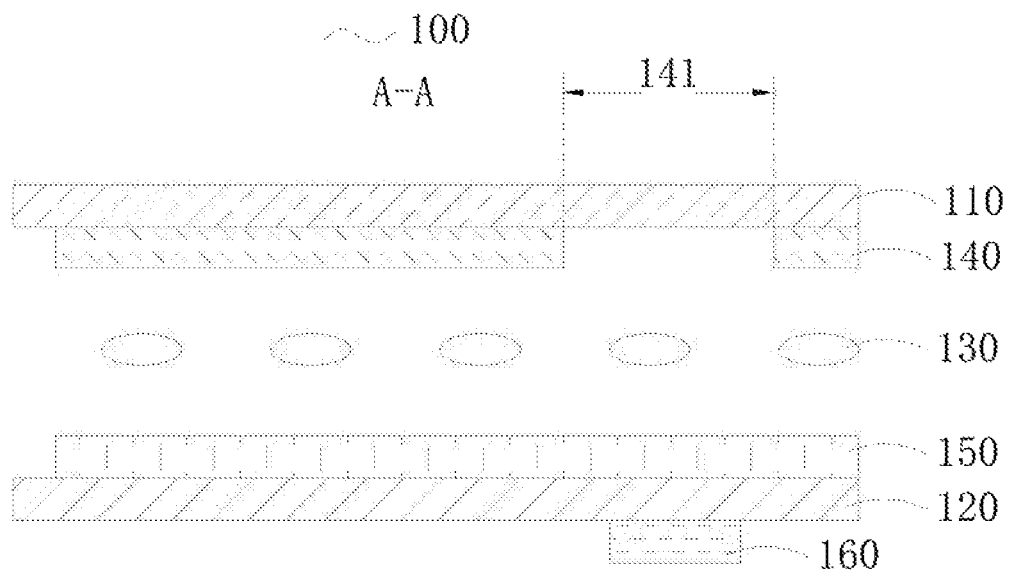
FIG. 2 is a schematic cross-sectional view of the display panel along A-A direction of FIG. 1 according to an embodiment of the present disclosure.

As shown in FIG. 2, a color filter layer 140 is disposed on a side of the first substrate 110 adjacent to the second substrate 120, the color filter layer 140 is provided with a light-transmitting portion 141 at a position corresponding to the camera assembly 160, and a thin film transistor layer 150 is disposed on a side of the second substrate 120 adjacent to the first substrate 110. The color filter layer 140 includes a plurality of red sub-pixels, blue sub-pixels, and green sub-pixels, and a black matrix disposed between adjacent sub-pixels.

Specifically, the light-transmitting portion 141 is a through hole penetrating the color filter layer 140, and is configured to provide a light propagation path for the camera assembly 160. Incident light from outside of the display panel can pass through the first substrate 110, the light-transmitting portion 141, then pass through the liquid crystal layer 130 and the second substrate 120 to finally reach the camera assembly 160, thereby realizing conditions that the camera assembly 160 acquires external light.

In this embodiment, a cross-sectional shape of the light-transmitting portion in B-B direction as shown in FIG. 1 includes a polygon, a circle, or an ellipse.

In this embodiment, in order to increase amount of external light acquired by the camera assembly 160 to achieve a better photographing and imaging effect, a cross-sectional area of the light-transmitting portion 141 along the B-B direction should be greater than or equal to a cross-sectional area of the camera assembly 160 along the B-B direction.

In this embodiment, the thin film transistor layer 150 is disposed on the side of the second substrate adjacent to the first substrate, and the thin film transistor layer 150 is configured to: control the liquid crystal layer 130 to deflect liquid crystal corresponding to the light-transmitting portion 141, so that light reaches the camera assembly 160 through the liquid crystal layer 130 after receiving a start command from the camera assembly 160; and control the liquid crystal layer 130 to deflect the liquid crystal corresponding to the light-transmitting portion 141 after receiving a close command from the camera assembly, so that the light cannot pass through the liquid crystal layer 130, and the display panel corresponding to the light-transmitting portion 141 exhibits black screen.

As shown in FIG. 1, a display screen of the display panel is divided into a first display portion 101 and a second display portion 102, the first display portion 101 is set as a status bar of the display panel, and the second display portion 102 is set as a regular display section. Specifically, a background of the first display portion 101 is fixedly set to black, that is, when the camera assembly 160 is turned off, a black screen presented by the light-transmitting portion 141 is integrated with a black screen presented by the first display portion 101, so that visual effect of the full-screen display can be presented.

Specifically, the thin film transistor layer 150 includes a buffer layer, a gate insulating layer, a gate line layer, an interlayer dielectric layer, a source-drain electrode layer, a planarization layer, and a pixel electrode layer, which are stacked on the second substrate (not shown in the figure).

Figure 3:
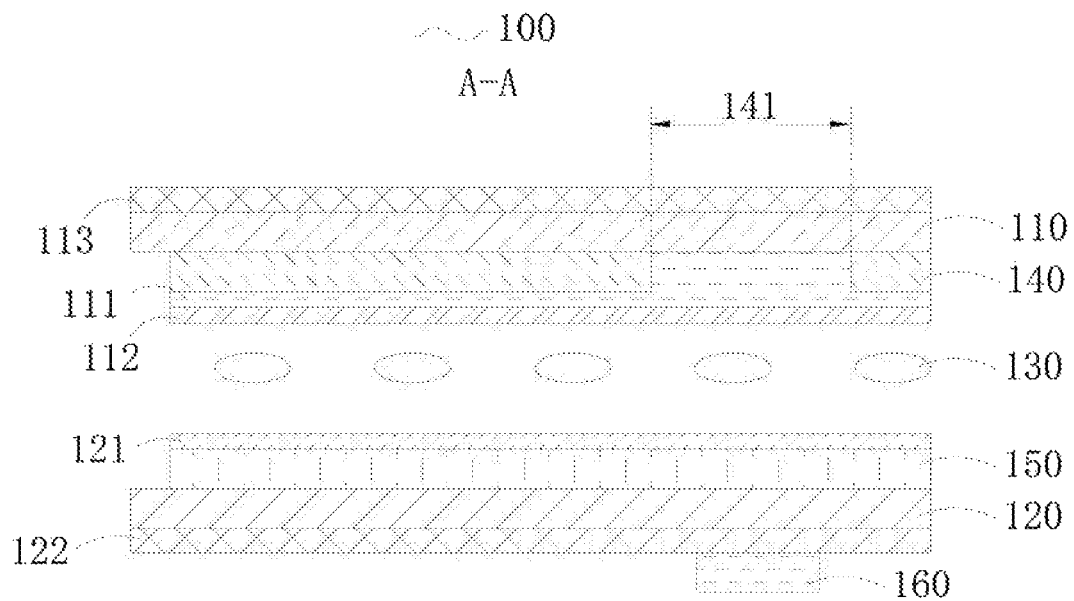
FIG. 3 is a schematic cross-sectional view of the display panel along the A-A direction of FIG. 1 according to another embodiment of the present disclosure.

In this embodiment, as shown in FIG. 3, the display panel 100 further includes a common electrode layer 111 disposed on a side of the color filter layer 140 adjacent to the second substrate 120. The common electrode layer 111 covers the color filter layer 140 and covers the light-transmitting portion 141. The common electrode layer 111 is a transparent electrode and is made of indium tin oxide (ITO). Therefore, the common electrode layer 111 fills the light-transmitting portion 141, and the liquid crystal deflection is controlled together with the corresponding portion of the thin film transistor layer. At the same time, it is possible to keep the light passing through the light-transmitting portion 141 into the camera assembly 160.

In this embodiment, as shown in FIG. 3, the display panel 100 further includes a first alignment layer 112 and a second alignment layer 121. The first alignment layer 112 is disposed on a side of the common electrode layer 111 adjacent to the second substrate 120, the second alignment layer 121 is disposed on a side of the thin film transistor layer 150 adjacent to the first substrate 110.

In this embodiment, the display panel 100 further includes a first polarizer 113 and a second polarizer 122. The first polarizer 113 is disposed on a side of the first substrate 110 away from the second substrate 120. The second polarizer 122 is disposed between the second substrate 120 and the camera assembly 160.

In this embodiment, the first substrate 110 is a color filter substrate, and the second substrate 120 is an array substrate.

In the embodiments of the present disclosure, the light-transmitting portion 141 configured to provide the light propagation path is disposed on the color filter layer 140, and the camera assembly 160 is disposed on the side of the second substrate 120 away from the first substrate 110 and at the position corresponding to the light-transmitting portion 141. After receiving the start command from the camera assembly 160, the thin film transistor layer 150 controls the liquid crystal layer 130 to deflect the liquid crystal corresponding to the light-transmitting portion 141, so that the light reaches the camera assembly through the liquid crystal layer 130, thereby realizing conditions that the camera assembly 160 under screen acquires external light. After receiving the close command from the camera assembly 160, the liquid crystal of the liquid crystal layer 130 corresponding to the light-transmitting portion 141 is controlled to be deflected, so that the light cannot pass the liquid crystal layer 130, the light-transmitting portion 141 presents a black screen, so that the display panel 100 is presented as a whole, and visual effect of the full-screen display is achieved.

The embodiment of the present disclosure further provides a display device including the display panel 100 as described above. The display device can achieve same technical effects as the display panel 100 described above, and details are not described herein again.

The embodiment of the present disclosure further provides a method of fabricating a display panel, which will be described in detail below with reference to FIGS. 3 and 4.

As shown in FIG. 4, FIG. 4 is a schematic flowchart of a method for fabricating a display panel according to an embodiment of the present disclosure, wherein the method includes:

step S10, providing a first substrate 110 and a second substrate 120, forming a color filter layer 140 on a side of the first substrate 110 adjacent to the second substrate 120 and a light-transmitting portion 141 for providing a light propagation path, wherein the light-transmitting portion 141 is a through hole penetrating the color filter layer 140;

step S20, sequentially forming a common electrode layer 111 and a first alignment layer 112 on a side of the color filter layer 140 adjacent to the second substrate 120;

step S30, ceiling the first substrate 110 and the second substrate 120 into a display panel 100; and step S40, setting a camera assembly 160 at a position corresponding to the light-transmitting portion 141 on a side of the second substrate 120 away from the first substrate 110.

Combined with the above FIG. 3, a specific fabrication process of the first substrate 110 and the second substrate 120 is not described herein again, and can be utilized in a manner of the conventional art. In the step S10, the light-transmitting portion 141 can be covered by a mask plate when depositing sub-pixels such as red, green, and blue, thereby forming the light-transmitting portion 141 penetrating the color filter layer 140. In some embodiments, the color filter layer 140 can be deposited first, and then the color filter layer 140 is etched to form the light-transmitting portion 141 penetrating the color filter layer.

Specifically, in the step S20, the common electrode layer 111 can be formed by a method of physical vapor deposition (PVD) or chemical vapor deposition (CVD).

The common electrode layer 111 is a transparent electrode and is made of indium tin oxide (ITO). Therefore, the common electrode layer 111 fills the light-transmitting portion 141, and the liquid crystal deflection is controlled together with the corresponding portion of the thin film transistor layer. At the same time, it is possible to keep the light passing through the light-transmitting portion 141 into the camera assembly 160.

In this embodiment, the thin film transistor layer 150 is disposed on a side of the second substrate adjacent to the first substrate, and the thin film transistor layer 150 is configured to: control the liquid crystal layer 130 to deflect liquid crystal corresponding to the light-transmitting portion 141, so that light reaches the camera assembly 160 through the liquid crystal layer 130 after receiving a start command from the camera assembly 160; and control the liquid crystal layer 130 to deflect the liquid crystal corresponding to the light-transmitting portion 141 after receiving a close command from the camera assembly, so that the light cannot pass through the liquid crystal layer 130, and the display panel corresponding to the light-transmitting portion 141 exhibits black screen.

In the embodiments of the present disclosure, the light-transmitting portion 141 for providing the light propagation path is disposed on the color filter layer 140, and the camera assembly 160 is disposed at a position corresponding to the light-transmitting portion 141 on the side of the second substrate 120 away from the first substrate 110. After receiving a start command from the camera assembly 160, the thin film transistor layer 150 controls the liquid crystal layer 130 to deflect the liquid crystal corresponding to the light-transmitting portion 141, so that the light reaches the camera assembly through the liquid crystal layer 130, thereby realizing conditions that the camera assembly 160 under screen acquires external light. After receiving a close command from the camera assembly 160, the liquid crystal of the liquid crystal layer 130 corresponding to the light-transmitting portion 141 is controlled to be deflected, so that the light cannot pass the liquid crystal layer 130, the light-transmitting portion 141 presents a black screen, so that the display panel 100 is presented as a whole, and visual effect of the full-screen display is achieved.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising:
   a first substrate;
   a second substrate disposed opposite to the first substrate;
   a liquid crystal layer disposed between the first substrate and the second substrate;
   a camera assembly disposed on a side of the second substrate away from the first substrate; and
   a common electrode layer disposed on a side of a color filter layer adjacent to the second substrate,
   wherein the color filter layer is disposed on a side of the first substrate adjacent to the second substrate, the color filter layer is provided with a light-transmitting portion at a position corresponding to the camera assembly, and a side of the second substrate adjacent to the first substrate is provided with a thin film transistor layer, and
   wherein the common electrode layer fills the light-transmitting portion.

2. The display panel according to claim 1, wherein the light-transmitting portion is a through hole penetrating the color filter layer, and a cross-sectional shape of the light-transmitting portion comprises polygon, circle, or ellipse.

3. The display panel according to claim 2, wherein a cross-sectional area of the light-transmitting portion is greater than or equal to a cross-sectional area of the camera assembly.

4. The display panel according to claim 1, wherein the thin film transistor layer comprises a buffer layer, a gate insulating layer, a gate line layer, an interlayer dielectric layer, a source-drain electrode layer, a planarization layer, and a pixel electrode layer, which are stacked on the second substrate.

5. The display panel according to claim 1, further comprising a first alignment layer and a second alignment layer, wherein the first alignment layer is disposed on a side of the common electrode layer adjacent to the second substrate, and the second alignment layer is disposed on a side of the thin film transistor layer adjacent to the first substrate.

6. The display panel according to claim 5, further comprising a first polarizer and a second polarizer, wherein the first polarizer is disposed on a side of the first substrate away from the second substrate, and the second polarizer is disposed between the second substrate and the camera assembly.

7. The display panel according to claim 1, wherein the first substrate is a color filter substrate, and the second substrate is an array substrate.

8. A display device, comprising a display panel, the display panel comprising:
   a first substrate;
   a second substrate disposed opposite to the first substrate;
   a liquid crystal layer disposed between the first substrate and the second substrate;
   a camera assembly disposed on a side of the second substrate away from the first substrate; and
   a common electrode layer disposed on a side of a color filter layer adjacent to the second substrate,
   wherein the color filter layer is disposed on a side of the first substrate adjacent to the second substrate, the color filter layer is provided with a light-transmitting portion at a position corresponding to the camera assembly, and a side of the second substrate adjacent to the first substrate is provided with a thin film transistor layer, and
   wherein the common electrode layer fills the light-transmitting portion.

9. The display device according to claim 8, wherein the light-transmitting portion is a through hole penetrating the color filter layer, and a cross-sectional shape of the light-transmitting portion comprises polygon, circle, or ellipse.

10. The display device according to claim 9, wherein a cross-sectional area of the light-transmitting portion is greater than or equal to a cross-sectional area of the camera assembly.

11. The display device according to claim 8, wherein the thin film transistor layer comprises a buffer layer, a gate insulating layer, a gate line layer, an interlayer dielectric layer, a source-drain electrode layer, a planarization layer, and a pixel electrode layer, which are stacked on the second substrate.

12. The display device according to claim 8, wherein the display panel further comprises a first alignment layer and a second alignment layer, the first alignment layer disposed on a side of the common electrode layer adjacent to the second substrate, and the second alignment layer disposed on a side of the thin film transistor layer adjacent to the first substrate.

13. The display device according to claim 12, wherein the display panel further comprises a first polarizer and a second polarizer, wherein the first polarizer is disposed on a side of the first substrate away from the second substrate, and the second polarizer is disposed between the second substrate and the camera assembly.

14. The display device according to claim 8, wherein the first substrate is a color filter substrate and the second substrate is an array substrate.

15. A method of fabricating a display panel, comprising:
- step S10, providing a first substrate and a second substrate, forming a color filter layer on the first substrate and a light-transmitting portion for providing a light propagation path, wherein the light-transmitting portion is a through hole penetrating the color filter layer;
- step S20, sequentially forming a common electrode layer and a first alignment layer on a side of the color filter layer adjacent to the second substrate, wherein the common electrode layer fills the light-transmitting portion;
- step S30, ceiling the first substrate and the second substrate into a display panel; and
- step S40, setting a camera assembly at a position corresponding to the light-transmitting portion on a side of the second substrate away from the first substrate.

\* \* \* \* \*